United States Patent [15] 3,673,458
Moggre [45] June 27, 1972

[54] CIRCUIT ARRANGEMENT COMPRISING SWITCHING MEANS FOR PERIODICALLY INTERRUPTING A CURRENT SUPPLIED TO AN INDUCTING COIL

[72] Inventor: Anthonie Jannis Moggre, Emmasingel, Eindhoven, Netherlands

[73] Assignee: U.S. Phillips Corporation, New York, N.Y.

[22] Filed: Nov. 17, 1969

[21] Appl. No.: 877,199

[30] Foreign Application Priority Data

Nov. 20, 1968 Netherlands..........................6816601

[52] U.S. Cl...........................................315/27 R, 315/31 R
[51] Int. Cl...........................................H01j 29/70
[58] Field of Search......................315/27, 22, 27 TD, 30, 31; 178/7.5

[56] References Cited

UNITED STATES PATENTS 3,500,116 3/1970 Rietveld..................................315/27
2,276,455 3/1942 Beers......................................315/27
3,501,589 3/1970 Bart........................................315/27
3,519,741 6/1970 Knight....................................315/27

*Primary Examiner*—Leland A. Sebastian
*Assistant Examiner*—J. M. Potenza
*Attorney*—Frank R. Trifari

[57] ABSTRACT

A circuit for obtaining a focus voltage that varies with the final anode voltage has a rectifier, a resistor, and a capacitor connected to a horizontal output transformer, which is specially designed to be resonant at the fifth harmonic. The series arrangement of the diode and the capacitor is connected between primary and secondary windings of the transformer, namely the anode of the diode is connected to a tap on the primary, and the remaining end of the capacitor is connected to that end of the secondary winding to which a capacitor for the fifth harmonic tuning is connected. The other capacitor end is connected to a tap on the primary. The latter tap comprises a much smaller number of turns than the first-mentioned tap to which the anode of he diode is connected. The required focusing voltage is derived from the resistor which is arranged between the cathode of the diode and ground.

6 Claims, 2 Drawing Figures

PATENTED JUN 27 1972 3,673,458

Figure 1:
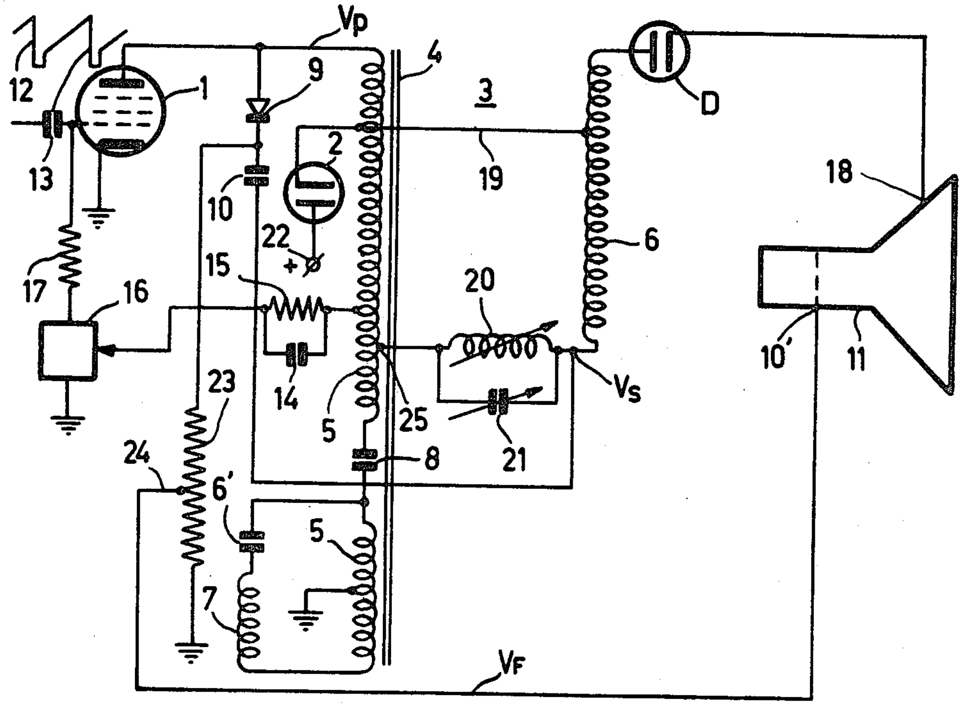

CIRCUIT ARRANGEMENT COMPRISING SWITCHING MEANS FOR PERIODICALLY INTERRUPTING A CURRENT SUPPLIED TO AN INDUCTING COIL

The invention relates to a circuit arrangement comprising switching means for periodically interrupting a current which is supplied to an induction coil to which a deflection coil of a display tube may be connected in parallel. The voltage occurring across the coil upon interruption of said current is stepped up by means of a transformer and applied to a load circuit for producing an extra high tension (EHT). The total leakage inductance ($L_2$) of the transformer is chosen in such a manner that the current flowing through the leakage inductance ($L_2$) and the differential coefficient of said current are zero both at the instant of interruption and at the instant of reclosure of the current supply circuit. This is so because of the network formed by the parallel arrangement of the primary inductance ($L_1$) and capacity ($C_1$) of the transformer and the series arrangement of the leakage inductance ($L_2$) and associated parallel capacity ($C_2$) and the total secondary capacity ($C_3$) the two angular frequencies for parallel resonance $\alpha$, the fundamental harmonic, and $\gamma$, the higher harmonic substantially satisfy the relation $$\frac{\gamma}{\alpha} \cong (2K+1)\left[1-\frac{4}{\pi^2}\cdot\frac{z}{1-z}\cdot\left\{1-\frac{1}{(2K+1)^2}\right\}\right]$$

wherein K is a constant to be chosen and $z$ is the ratio between the duration of the current interruption and the duration of the period. In order to obtain an internal resistance ($R_i$) which is as low as possible, K is chosen to be an even number for the EHT-circuit, that is to say, 2, 4, 6 etc, while the leakage inductance ($L_2$) and the associated parallel capacity ($C_2$) are given such values that the ratio of the angular frequency $\delta$ for the parallel resonance of said leakage inductance ($L_2$) and associated parallel capacity ($C_2$) and the fundamental harmonic angular frequency $\alpha$ assume values which may lie between a lower limit of substantially $$\frac{\delta}{\alpha} \cong 0.95\sqrt{\frac{\gamma^2}{\alpha^2}+\frac{\gamma}{\alpha}+1}$$

and an upper limit of substantially:

$$\frac{\delta}{\alpha} = 2\sqrt{\frac{\gamma^2}{\alpha^2}+\frac{\gamma}{\alpha}+1}$$

a winding closely coupled to the secondary winding is connected to part of the primary. The transformation ratio of the winding which is closely coupled to the secondary and the part of the primary to which this winding is connected is substantially 1 : 1. Which connection includes at least a capacitor so as to obtain the desired ratio of $\delta/\alpha$. For obtaining a focusing voltage for the focusing electrode and ensuring the electrostatic focusing in the display tube, a rectifier circuit is provided which circuit comprises the series arrangement of a rectifier and a smoothing network which network is built up from a resistor and a capacitor having a large time constant. The free end of the rectifier is connected to the primary, while the free end of the resistor is connected to ground. The voltage generated across the said smoothing resistor is applied to said focusing electrode.

When operating the display tube correctly, the problem occurs that in case of variation of the beam current flowing in this display tube, or beam currents if a three-beam current color display tube is used, the focusing thereof remains optimum. In fact, it is common practice in modern display tubes to use electrostatic focusing for which purpose a so-called focusing electrode is provided in the display tube. It is then necessary that the focusing voltage on the focusing electrode proportionally varies with a variation of the the which is applied to the final anode of this display tube in case of beam current variation in the display tube.

A solution to this problem is known, for example, from the publication "Philips Product Note, Electronic Components and Materials division, no. 4: line output transformer AT 2053, a new concept for inexpensive line output stages in color TV receivers." In FIG. 1 of this publication a rectifier circuit comprising the series arrangement of a rectifier and a smoothing network having a larger time constant is used for obtaining a focusing voltage. The rectifier is connected to a tap on the primary of the transformer. The smoothing network comprises a resistor which is connected between the other end of the rectifier and ground, and a capacitor which is connected between the junction of the rectifier and the resistor and the wiper on a potentiometer. The voltage generated across said resistor is applied to the focusing electrode. The potentiometer is connected between two taps on windings of the transformer, on which taps respectively positively and negatively directed line flyback pulses are produced, the voltage across the rectifier and hence the focusing voltage being adjustable. Since the transformer is tuned in the manner as described in U.S. Pat. Application 768,013 filed on Oct. 16, 1968, now U.S. Pat. No. 3,500,116, these pulses have flatter peaks as would otherwise be the case, to that a certain extent of proportional variation of the focusing voltage with the EHT is obtained. However, it has been found in practice that this was insufficient. Therefore, the present invention has for its object to provide a better proportional variation of these voltages and to this end it is characterized in that the free end of the capacitor is connected to that point of the winding which is closely coupled to the secondary to which the capacitor for obtaining the desired ratio $\delta/\alpha$ is connected.

In order that the invention may be readily carried into effect, one embodiment thereof will now be described in detail by way of example with reference to the accompanying diagrammatic drawing, in which:

FIG. 1 shows the circuit arrangement according to the invention, and

Figure 2:
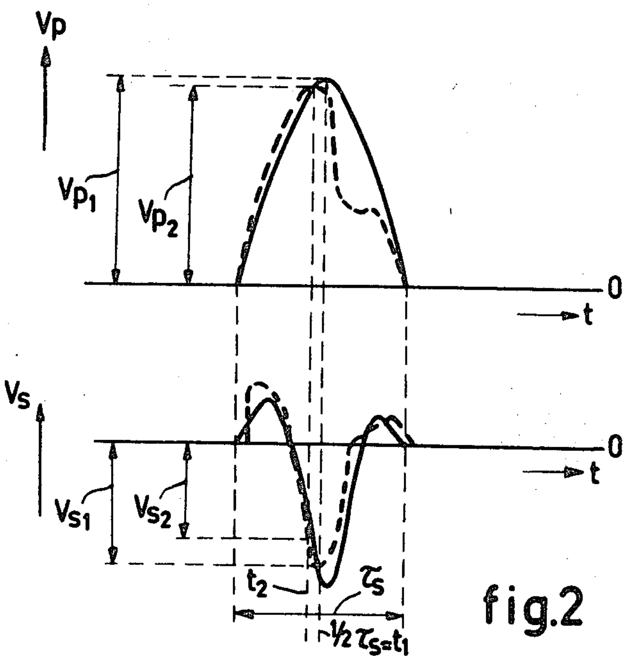

FIG. 2 serves to explain the operation of the circuit arrangement of FIG. 1.

FIG. 1 shows a circuit arrangement for generating the line deflection current for a television display tube. In this Figure the line output tube is indicated by the reference numeral 1 and the series booster diode is indicated by 2 both of which are connected to the line output transformer 3 which is provided with a core 4, a primary 5 and a secondary 6. The line deflection coil 7 is connected to the lower winding of the primary 5 through a capacitor 6'. The so-called booster capacitor 8 is provided between the two parts of the winding 5. Furthermore a diode 9 which is connected through a capacitor 10 to a point indicated by $V_S$ in FIG. 1 is connected to the primary. The focus voltage $V_F$ is derived from the junction of capacitor 10 and diode 9, which voltage is applied to the focusing electrode 10' of the display tube 11.

The output pentode 1 is controlled by means of a sawtooth control signal 12 which is applied through a capacitor 13 to the control grid of the valve 1. The parallel arrangement of a capacitor 14 and a resistor 15 is furthermore connected to the primary 5 which arrangement applies a control voltage from the primary 5 to the control circuit 16 which applies a control voltage through the grid leak resistor 17 to the control grid of the tube 1 so that this tube can be controlled in known manner. Consequently, the pentode 1 and the series booster diode 2 and control circuit 16 are to be considered as a voltage source which in any case will attempt to maintain the deflection energy as constant as possible.

The required EHT for the final anode of the display tube 11 is obtained in that the pulses, which occur at the primary 5 during the interruption of the current because then both pentode 1 and diode 2 are cut off, are stepped up by means of the secondary 6, subsequently rectified by the EHT-diode D, which rectified voltage can be applied to the final anode 18 of the display tube 11.

Furthermore FIG. 1 shows that the primary 5 is partly directly coupled to the secondary 6 by means of a connection 19 at the one end and by means of a parallel arrangement comprising an adjustable induction coil 20 and a variable capacitor 21 at the other end. As described in said U.S. Pat. No. 3,500,116 the connection 19 and the parallel arrangement of coil 20 and capacitor 21 is provided to obtain the desired value of the leakage inductance and associated parallel capacity between primary 5 and secondary 6 so as to be able to adjust the desired ratio $\delta/\alpha$ which is necessary to render the internal resistance of the EHT-circuit as small as possible.

FIG. 1 also shows that the overall positive supply voltage is applied to the circuit arrangement of FIG. 1 at the terminal 22 which is connected to the anode of the series booster diode 2.

The junction of diode 9 and capacitor 10 from which the focusing voltage $V_F$ is derived, is connected to ground through the smoothing resistor 23. From a tap 24 on this resistor 23 a connection is then established between the resistor 23 and the focusing electrode 10'. If desired, the tap 24 may be variable so as to be able to adjust the desired focusing voltage $V_F$ exactly therewith.

It has been stated in the foregoing that it will be attempted with the circuit arrangement of FIG. 1 to maintain the variations of the EHT at the final anode 18 within reasonable limits, which variations are caused by variations of the beam current flowing through the tube 11. Particularly when the tube 11 is a color display tube it is necessary to maintain the variation of this EHT small because otherwise color purity error will appear. However, the variations still occurring will influence the focusing of one or more electron beams flowing in the display tube too much when the focusing voltage $V_F$ does not proportionally vary simultaneously to a sufficient extent. It is therefore necessary to cause this voltage $V_F$ to vary in the correct proportion with the variations which will occur in the EHT at the final anode 18. As already described in the preamble, this is achieved by connecting capacitor 10 not to ground, but to interconnect it to the point $V_S$. In that case the overall voltage which is set up across the rectifier circuit comprising the diode 9 and the capacitor 10 and smoothing resistor 23 will be given by the voltages prevailing between the anode of the tube 1 and the point $V_S$. The voltage of the anode of the tube 1 is indicated by $V_p$ and shown in the upper part of FIG. 2 for the flyback period $\tau_s$. The voltage at the point $V_S$ is denoted by the same symbol and shown in the lower part of FIG. 2 for the said flyback period $\tau_s$.

Since the rectifier circuit 9, 10, 23 is formed as a peak rectifier due to the large time constant of the network 10, 23, this rectifier will react to the peak value of the signal $V_p + V_S$ which is active exactly during the said flyback period $\tau_s$ across this rectifier. According to the invention, the point $V_S$ has been taken as the lower connection point for the rectifier circuit 9, 10, 23, because approximately in the middle of the flyback period $\tau_s$, which in FIG. 2 is denoted by the instant $t_1 = \frac{1}{2}\tau_s$, the maximum value of the voltage $V_p + V_S$ set up across this rectifier will occur when the overall beam current (which is the value of a single beam current if it is a one-beam current display tube or the sum of the three beam currents if it is a three-beam current color display tube) flowing through the display tube 11 is adjusted at a very small value. For the Example of FIG. 2 it has been assumed that the beam current is approximately 100 $\mu$A at the said instant $t_1$, the voltage $V_p$ then assuming a value of $V_{p1}$ which is equal to approximately 5.18 kV. The voltage $V_S$ at the same instant $t_1$ assumes a value of $V_{S1}$ which is equal to approximately 800 V. Consequently, the overall voltage which is active on the rectifier circuit at the instant $t_1$ is 5.98 kV which peak voltage is then rectified and brought to the desired value through the tap 24, and is subsequently applied to the focusing electrode 10'.

If the beam current flowing through the display tube 11 increases, two phenomena take place.

1. The voltage $V_p$ slightly decreases and
2. A small phase shift occurs, so that the peak $V_{p2}$ of the voltage $V_p$ will no longer occur at the instant $t_1$, but at the instant $t_2$. However, the decrease of the peak value $V_{p1}$ to the peak value $V_{p2}$ is only very small. For the Example of FIG. 2 it has been assumed that the beam current associated with the voltage $V_{p1}$ was $\rightarrow$ 100 $\mu$A, while for the voltage $V_{p2}$ this is $\rightarrow$ 600 $\mu$A with which a voltage $V_{S2}$ of approximately 560 V is associated. However, the decrease of the voltage $V_{p1}$ is small, for $V_{p1}$ is equal to 5.18 kV, while $V_{p2} \rightarrow$ 5.03 kV, which is a decrease of 150 V. This decrease of the voltage $V_p$ is too small to ensure a satisfactory focusing of the beam current or the three beam currents if a three-beam current display tube is used in case of the simultaneously occurring decrease of the EHT at the final anode 18. In fact, the final anode voltage must be approximately 25 kV if the tube 11 is a color display tube, which means that the voltage $V_p$ of approximately 5 kV must be stepped up by a factor of 5 by means of the secondary 6. For the beam current of 100 $\mu$A this stepped-up voltage is approximately 25 kV and for a beam current of 1,600 $\mu$A this EHT is 23 kV, which is a decrease of approximately 8 percent. This is an overall decrease by approximately 2 kV of the final anode voltage. If the decrease of the focusing voltage $V_F$ would only be 150 V this decrease relative to the said decrease of 2 kV of the final anode voltage would be too small. However, since the voltage $V_p + V_S$ is taken for the rectifier circuit 9, 10, 23, and the voltage $V_{S2}$ at the said beam current of 1,600 $\mu$A is $\rightarrow$ 560 V, the overall focusing voltage for the beam current of 100 $\mu$A is proportional to $$V_{p1} + V_{S1} = 5.18 + 0.80 = 5.98 \text{ kV, while}$$

this focusing voltage for the beam current of 1,600 $\mu$A is proportional to $$V_{p2} + V_{S2} = 5.03 + 0.56 = 5.59 \text{ kV}.$$

The overall decrease of the rectified voltage thus is (5.98 − 5.59) kV = 390.V. With respect to the original 5kV, this decrease, and also the decrease of the focusing voltage $V_f$, is likewise approximately 8 percent and in percentage is therefore substantially equal to the decrease of the final anode voltage, and hence sufficient to obtain the desired focusing at any adjustment of the beam current between the said small adjustment of approximately 100 $\mu$A and the maximum adjustment of approximately 1,600 $\mu$A.

In addition the possibility is provided to vary the value of $V_S$. In fact, the number of turns on winding 5 between the connection 19 and the tap 25 and the number of turns on the winding 6 between connection 19 and point $V_S$ may be increased so that the value of the voltage $V_S$ and hence that of $V_{S1}$ and $V_{S2}$ is increased.

Although an embodiment employing tubes is described in the foregoing, it will be evident that the same principle may alternatively be used in embodiments employing transistors, if only a final transistor is available which can stand a sufficiently high voltage during the flyback period $\tau_s$.

I claim:

1. A circuit for operation from a voltage source comprising an induction coil; switching means coupled to said coil and said source for discontinuously applying the voltage from said source through said coil; a television deflection coil coupled to said induction coil; a transformer having a primary coupled between said switching means and said induction coil, and a secondary for supplying display tube high voltage; a winding closely coupled to said secondary and having first and second ends, said first end being coupled to said primary; an first capacitor coupled between said winding second end and said primary; a rectifier having one end coupled to said primary, and a second end; a resistor means for supplying a focusing voltage having a first end coupled to said rectifier second end, and a second end coupled to ground; a second capacitor having a first end coupled to said rectifier second end, and a second end coupled to the junction of said first capacitor and said winding.

2. A circuit as claimed in claim 1 wherein said winding and said secondary comprise portions of the same coil.

3. A circuit as claimed in claim 1 wherein said resistor and second capacitor have a substantially large time constant.

4. A circuit as claimed in claim 1 wherein said induction coil and said primary comprise portions of the same coil.

5. A circuit as claimed in claim 1 wherein said switching means comprises a horizontal output tube.

6. A circuit as claimed in claim 1 further comprising an inductor coupled in parallel with said first capacitor.

* * * * *